(12) United States Patent
Nakamura et al.

(10) Patent No.: US 8,477,519 B2
(45) Date of Patent: Jul. 2, 2013

(54) METHOD FOR CONTROLLING A SWITCHING POWER UNIT USING AN AC/DC CONVERTER, A POWER FACTOR CORRECTION UNIT, AND A DC/DC CONVERTER UNIT

(75) Inventors: Yoshihiro Nakamura, Kitasaku-gun (JP); Takashi Kawai, Kitasaku-gun (JP)

(73) Assignee: Minebea Co., Ltd, Kitasaku-gun (JP)

( * ) Notice: Subject to any disclaimer, the term of this patent is extended or adjusted under 35 U.S.C. 154(b) by 92 days.

(21) Appl. No.: 13/177,290

(22) Filed: Jul. 6, 2011

(65) Prior Publication Data

US 2012/0014152 A1    Jan. 19, 2012

(30) Foreign Application Priority Data

Jul. 13, 2010  (JP) ................................. 2010-158813

(51) Int. Cl.
*H02M 7/155*    (2006.01)
*H02M 7/162*    (2006.01)
(52) U.S. Cl.
USPC .......................... 363/126; 363/127; 363/165
(58) Field of Classification Search
USPC .................. 363/123, 125–127, 130, 163, 165
See application file for complete search history.

(56) References Cited

U.S. PATENT DOCUMENTS 2,010,279 A * 8/1935 Spohr ............................. 62/222
5,751,567 A * 5/1998 Toyozaki et al. ............... 363/89
5,793,624 A * 8/1998 Couture et al. ................. 363/89
7,250,742 B2 * 7/2007 Li ................................. 323/207
2006/0245219 A1 * 11/2006 Li ................................... 363/89
2010/0014320 A1 * 1/2010 Nakanishi ....................... 363/16
2011/0002445 A1 * 1/2011 Hattrup et al. ................ 378/101
2011/0038190 A1 * 2/2011 Zimpfer ........................ 363/126
2011/0075462 A1 * 3/2011 Wildash ........................ 363/127
2011/0227522 A1 * 9/2011 Shinomoto et al. ...... 318/400.29
2012/0212986 A1 * 8/2012 Minami et al. ............... 363/126

FOREIGN PATENT DOCUMENTS

JP       A-2008-283818        11/2008

* cited by examiner

*Primary Examiner* — Adolf Berhane
*Assistant Examiner* — Nusrat Quddus
(74) *Attorney, Agent, or Firm* — Oliff & Berridge, PLC

(57) ABSTRACT

There is provided a method for controlling a switching power unit that converts AC input voltages of an AC source into a DC voltages while improving a power-factor of the AC input voltages, the switching power unit comprising an AC/DC converter circuit that is composed of a power-factor correction unit and a current resonance converter unit wherein at least a part of switching elements of the current resonance converter unit is shared with switching elements of the power-factor correction unit, wherein around timing that polarities of the AC source are switched between a positive half cycle and a negative half cycle, ON-and-OFF control of the switching elements are performed as that high frequency voltages that are applied to a primary winding of a high frequency transformer which is a part of the current resonance converter unit are to be symmetrical in a positive and negative relation.

15 Claims, 10 Drawing Sheets

F I G. 4
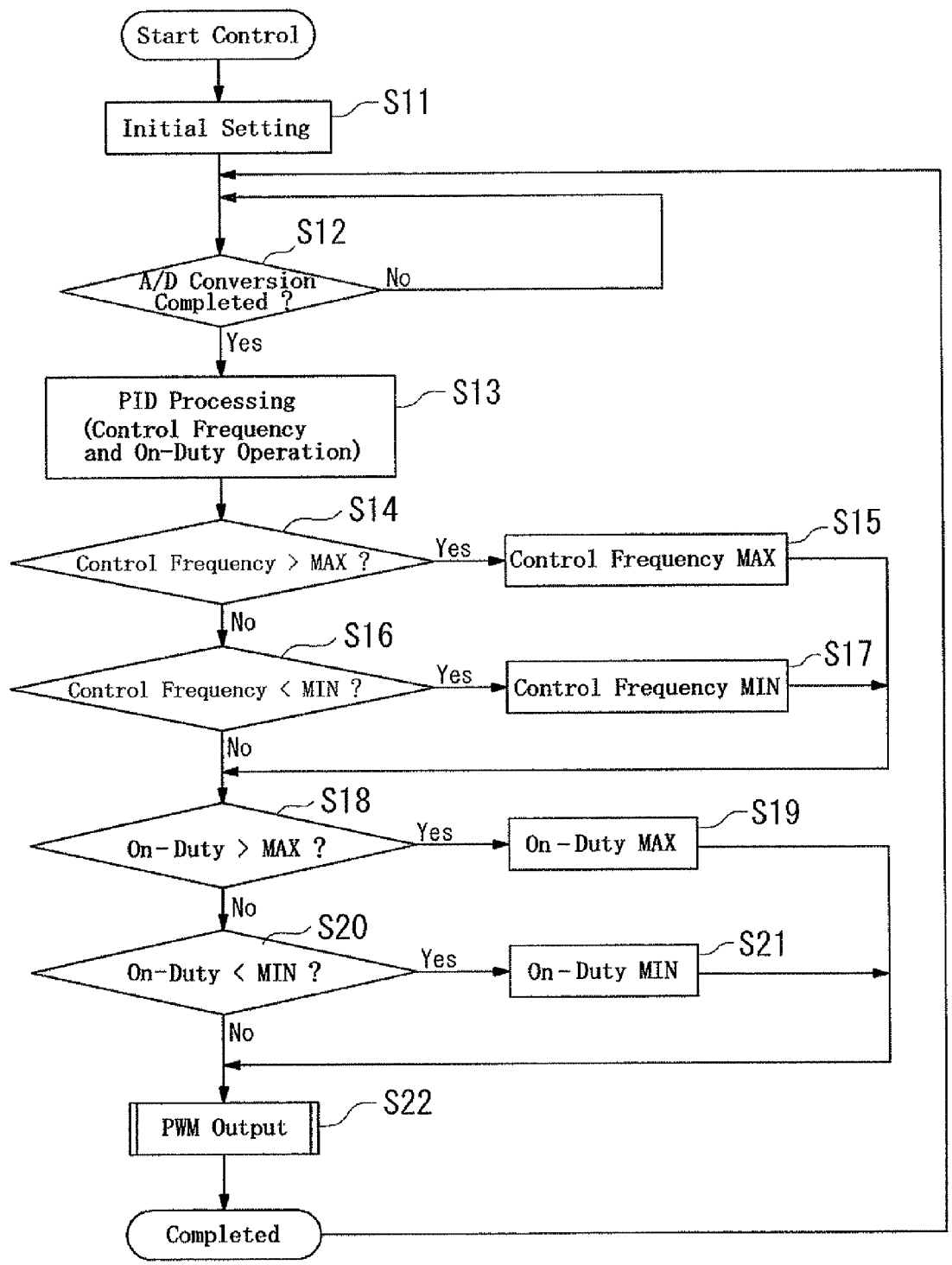

METHOD FOR CONTROLLING A SWITCHING POWER UNIT USING AN AC/DC CONVERTER, A POWER FACTOR CORRECTION UNIT, AND A DC/DC CONVERTER UNIT

BACKGROUND OF THE INVENTION

1. Field of the Invention

The present invention relates to a method for controlling a switching power unit, more particularly to a control method that is properly applied to a switching power unit being composed of an AC/DC converter circuit which includes a power-factor correction (PFC) unit and a DC/DC converter unit.

2. Description of the Related Art

For digital apparatuses or domestic amusement equipments such as a laptop computer, a liquid crystal television, a plasma television, a game instrument and the like, a switching power unit that is composed of an AC/DC converter in which to improve a power-factor has been applied. In general, the switching power unit comprises a full-wave rectifier bridge, a booster-type power-factor correction (PFC) unit and a DC/DC converter unit.

For the DC/DC converter unit, a flyback type converter, a forward type converter, a current resonance (LLC) type converter, etc. can be named. Here, when a highly effective power supply is needed, the current resonance type converter has been widely applied.

In FIG. 8, a half-bridge type switching power unit is disclosed. See Japanese Patent Application Laid-Open No. 2008-283818 (hereinafter referred to as the "Patent Document"). This half-bridge type switching power unit is composed of a full-wave rectifier bridge 18, a power-factor correction unit 20, and a half-bridge type current resonance converter 30.

In the circuit structure of the half-bridge type switching power unit, the power-factor correction unit 20 has an active filter including an inductor 21, a diode 22 and a switch element 23 and a smoothing capacitor 26 between the full-wave rectifier bridge 18 and two switching elements 31, 32 provided on the input side of the current resonance converter 30.

Further, in the current resonance converter 30, a series resonant circuit (a resonant capacitor 33 and a resonant inductor 34) is connected between the intermediate point of a series circuit composed of the switching elements 31, 32 and the primary winding of a transformer TF. Current that flows toward the secondary winding of the transformer TF is rectified and smoothed by rectifier diodes 35, 36 and a capacitor 37 so as to obtain predetermined output voltages.

In this circuit, by alternatively turning ON and OFF the switching elements 31, 32 through a frequency controller 38, high frequency voltages that have been switched are applied to both ends of the primary winding of the transformer TF. The high frequency voltages are then output to the secondary side of the transformer TF thereby being converted into the output voltages of direct current.

This switching power unit can convert the current resonance converter 30 in a high efficient condition; however, the switching power unit is a multi-level circuit structure composed of 3 elements: the full-wave rectifier bridge 18; the power-factor correction unit 20; and the current resonance converter 30. Accordingly, the overall efficiency of the unit will be generally reduced by approximately 85 to 90%.

In the above condition, in a prior application (Japanese Patent Application No. 2010-85394) the present inventors have invented a full-bridge type switching power unit by eliminating a full-wave rectifier bridge and to improve conversion efficiency by sharing a power-factor correction unit and the switching elements of a current resonance converter unit.

FIG. 9 is a block diagram that shows an AC/DC converter circuit 1 which constitutes the main portion of the switching power unit discussed hereinabove. The AC/DC converter circuit 1 of FIG. 9 is composed of a power-factor correction (PFC) unit 2 and a current resonance (LLC resonance) type DC/DC converter unit 3 (hereinafter referred to as the "current resonance converter unit 3"). In the power-factor correction unit 2, the series circuit of first/second diodes D1, D2 and the series circuit of first/second switching elements Q1/Q2 are connected to each other in parallel while a booster inductor L1 and an AC source Vac is connected to each other in series between these series circuits. Further, a first smoothing capacitor Ci is connected to the both ends of the series circuit of the first/second diodes D1, D2 in parallel relative to the first/second switching elements Q1, Q2.

In the block diagram of FIG. 9, the booster inductor L1 has one end that is connected to the intermediate point of the first and second diodes D1, D2, and has the other end that is connected to one end of the AC source Vac. However, it would be possible that the AC source Vac and the booster inductor L1 may be arranged in an inversed manner, or either a resonant capacitor Cr or a resonant inductor Lr of a series resonant circuit 6, or both of them may be connected between the intermediate point of a third/fourth switching elements Q3, Q4 and the primary winding of a high frequency transformer TF. Further, the resonant inductor Lr may be replaced by a leakage inductance of the high frequency transformer TF.

In the current resonance converter unit 3, the power-factor correction unit 2 and the first/second switching elements Q1, Q2 are shared with each other while the series circuit of the first/second switching elements Q1, Q2 and the series circuit of the third/fourth switching elements Q3, Q4 are connected to each other in parallel. Accordingly, a full-bridge circuit 5 that is composed of four switching elements (that is, the switching elements Q1 to Q4) is formed. Here, the first/third switching elements Q1, Q3 are arranged on a high voltage side while the second/forth switching elements Q2, Q4 are arranged on a low voltage side.

In the current resonance converter unit 3, at the subsequent stage of the full-bridge circuit 5, the series resonant circuit 6 including the resonant inductor Lr and the resonant capacitor Cr is arranged on the primary side of the high frequency transformer TF. On the other hand, a rectifier circuit that is composed of rectifier diodes D3, D4 and a second smoothing capacitor Co is provided at the secondary side of the high frequency transformer TF. As is shown in FIG. 9, the series resonant circuit 6 and the rectifier circuit are arranged to sandwich the high frequency transformer TF. The series resonant circuit 6 is connected in series to the primary winding of the high frequency transformer TF, and also connected to the intermediate point of the first/second switching elements Q1, Q2 as well as the intermediate point of the third/fourth switching elements Q3, Q4.

The AC/DC converter circuit 1 is composed of: a PFC voltage detector 10 that detects voltages at both ends of the first smoothing capacitor Ci of the power-factor correction unit 2 (referred to as the "PFC voltage" when appropriate); an output voltage detector 11 that detects the output voltage of the AC/DC converter circuit 1 (that is, voltages at both ends of the second smoothing capacitor Co); a polar detector 13 that detects the polarity of the AC source Vac; and a switching controller 12 that controls ON and OFF of the first to fourth switching elements Q1 to Q4. Output singles from the PFC voltage detector 10, the output voltage detector 11 and the polar detector 13 are input to the switching controller 12. Based on the output signals, the switching controller 12 generates pulse signals that drive the first to fourth switching elements Q1 to Q4. The pulse signals are then output to each of the switching elements. Normally, the first to fourth switching elements Q1 to Q4 are structured by MOSFET. In this case, the pulse signals that drive each of the switching elements Q1 to Q4 are gate drive signals.

In this switching power unit, the power-factor correction unit 2 constitutes a dual-boost converter circuit that controls PFC voltages based on the on-duty of the first switching element Q1 in the negative half cycle of the AC source Vac (in this period, the third switching element Q3 should turn ON and OFF in order to have the same on-duty with the first switching element Q1). On the other hand, in the positive half cycle of the AC source Vac, the dual-boost converter circuit controls the PFC voltages based on the on-duty of the second switching element Q2 (in this period, the fourth switching element Q4 should turn ON and OFF in order to have the same on-duty with the second switching element Q2).

The switching power unit is thus allowed to individually perform 1) the PWM control of PFC voltages in the power-factor correction unit 2 as discussed above; and 2) the output voltage controls of the current resonance converter 3 by changing the switching cycles of the full-bridge circuit 5. Further, since the power-factor correction unit 2 and the current resonance converter 3 share the first and second switching elements Q1, Q2, it becomes possible to structure the full-bridge switching power unit with no full-wave rectifier bridge thereby contributing to cost reduction and structure simplification by reducing a number of parts. Still further, since it can reduce switching losses and avoid multi-stages in the circuit structure, a highly efficient switching power unit with advanced power-factors can be achieved.

Here, in the AC/DC converter circuit 1 as shown in FIG. 9, as discussed hereinabove, switching elements that turn ON and OFF to obtain on-duty for controlling the PFC voltages (referred to as the "control gate" when appropriate) are switched between the pair of first/third switching elements Q1, Q3 and the pair of second/fourth switching elements Q2, Q4 based on the polar switching of the AC source Vac. However, when the control gate is simply switched as discussed above, the following problems may occur. Details are explained with reference to FIG. 10.

FIG. 10 exemplifies a case that polarity is switched from the negative half cycle to the positive half cycle of the AC source Vac, and shows normally expected drive controls at the switching elements Q1 to Q4 which switch the control gate. In the drive controls, a switching point M at the control gate indicates the starting point of a next new one cycle following a completed one cycle (of a switching cycle) that may include a point where the polarity of the AC source Vac has been switched. In this case, the polarity of the AC source Vac may have been switched at any time during the precedently completed one cycle right before the switching point M of the new cycle (meaning that at any time during a period I). Here, during the negative half cycle of the AC source Vac, gate drive signals that are output to the first/third switching elements Q1, Q3 are simply switched from the switching point M so as to output each of the second/fourth switching elements Q2, Q4. Accordingly, the control gate is switched from the first/third switching elements Q1, Q3 to the second/fourth switching elements Q2, Q4.

In this method, as shown in FIG. 10, around the switching point M, high frequency voltages that have been applied to the primary winding of the high frequency transformer TF become asymmetrical to each other in a positive-negative relation. More specifically, during the positive and the negative half cycles of the AC source Vac, the full-bridge circuit 5 should alternately repeat the following condition in every half cycle of the switching cycle: a first condition where the first/fourth switching elements Q1, Q4 are turned ON (the second/third switching elements Q2, Q3 are turned OFF); and a second condition where the second/third switching elements Q2, Q3 are turned ON (the first/fourth switching elements Q1, Q4 are turned OFF). Accordingly, the high frequency voltages that are symmetrical in a positive-and-negative relation are normally applied to the primary winding of the high frequency transformer TF. However, immediately before and after the switching point M, the first condition repeats twice with no intervention of the second condition. As a result, homopolar resonance voltages and homopolar resonance current are consecutively input twice to the high frequency transformer TF, meaning that the positive-negative asymmetry of the high frequency voltages occurs. Further, in case that polarity is switched from the positive half cycle to the negative half cycle of the AC source Vac, as long as the identical driver controls are based, the same problem should occur.

Thus, when the polarity of the AC source Vac is switched, large excitation current will temporarily flow to the high frequency transformer TF. Since this large excitation current appears in a cycle twice as much as the frequency of the AC source Vac, core vibrations of the high frequency transformer TF are generated at audio frequency bands thereby causing noises from the high frequency transformer TF.

SUMMARY OF THE INVENTION

The present invention has been made in the light of the above problem, and it is an object of the present invention to provide a method for controlling a switching power unit that can reduce noises generated from a transformer with no additional parts, a low cost and a simplified circuit structure.

In order to achieve the object described above, according to a first aspect of the present invention, there is provided a method for controlling a switching power unit that converts AC input voltages of an AC source into a DC voltages while improving a power-factor of the AC input voltages, the switching power unit comprising an AC/DC converter circuit that is composed of a power-factor correction unit and a current resonance converter unit wherein at least a part of switching elements of the current resonance converter unit is shared with switching elements of the power-factor correction unit, wherein around timing that polarities of the AC source are switched between a positive half cycle and a negative half cycle, ON-and-OFF control of the switching elements are performed as that high frequency voltages that are applied to a primary winding of a high frequency transformer which is a part of the current resonance converter unit.

In the first aspect of the present invention, the switching power unit includes a full-bridge type AC/DC converter circuit that is composed of: a series circuit comprising a first switching element and a second switching element; and a series circuit comprising a third switching element and a fourth switching element, wherein: each time polarity of the AC source is switched, a pair of first and third switching elements and a pair of second and fourth switching elements are each controlled to make turned ON and OFF alternately; while one pair of the switching elements has been being controlled to make turned ON and OFF, the other pair of the switching elements is each controlled to complementarily make turned ON and OFF relative to one pair of the switching elements that are connected in series to each other; and throughout the whole cycle of the AC source, pulse signals that drive the first to fourth switching elements are controlled as that resonance voltages and resonance current, polarities of which are changed in a certain cycle, are input to the high frequency transformer.

In the first aspect of the present invention, the switching power unit includes the full-bridge type AC/DC converter circuit that is composed of the power-factor correction unit and the current resonance converter unit which share a first switching element and a second switching element, wherein the power-factor correction unit is composed of: a series circuit comprising a first switching element and a second switching element; a series circuit comprising a first diode and a second diode; and a first smoothing capacitor that is connected in parallel with the series circuit of the first and second switching elements, the series circuit of the first and second switching elements and the series circuit of the first and second diodes are connected in parallel to each other, a booster inductor and the AC source are connected in series between the series circuits, and the current resonance converter unit comprises: a full-bridge circuit where the series circuit of the first and second switching elements and the series circuit of the third and fourth switching elements are connected in parallel to each other, and where the first and third switching elements are arrange on a high pressure side while the second and fourth switching elements are arranged on a low pressure side; the high frequency transformer that is driven by the full-bridge circuit; and a series resonance circuit that is connected to the primary winding of the high frequency transformer.

In the first aspect of the present invention, the switching power unit further comprises: a PFC voltage detector that detects PFC voltages at both ends of a first smoothing capacitor of the power-factor correction unit; an output voltage detector that detects output voltages at both ends of a second smoothing capacitor provided on a secondary side of the high frequency transformer of the current resonance converter unit; a polar detector that detects polarity of the AC source; and a switching controller by which ON and OFF operation of the first to fourth switching elements is controlled, wherein the switching controller is adapted to control the PFC voltages by changing on-duty of the first and second switching elements based on signals output from the PFC voltage detector, and the output voltages are controlled by changing switching cycles of the full-bridge circuit based on signals output from the output voltage detector.

In the first aspect of the present invention, the switching controller performs: 1) decision of whether polarity of the AC source is switched based on signals output from the polar detector; 2) ON and OFF operations relative to the second switching element so as to control the PFC voltages based on its on-duty during a positive half cycle where an intermediate side of the series circuit of the first and second switching elements of the AC source is positive; 3) ON and OFF operations relative to the fourth switching element so as to have the same on-duty with the second switching element; 4) control over the first and third switching elements so as to complementarily perform ON and OFF operations relative to each of the second and fourth switching elements; 5) ON and OFF operations relative to the first switching element so as to control the PFC voltages based on its on-duty during a negative half cycle where an intermediate point of the series circuit of the first and second switching elements of the AC source is negative; 6) ON and OFF operations relative to the third switching element so as to have the same on-duty with the first switching element; and 7) control over the second and fourth switching elements so as to complementarily perform ON and OFF operations relative to each of the first and third switching elements.

In the first aspect of the present invention, the switching controller performs that: 1) polarity switching of the AC source is decided based on signals output from the polar detector; 2) after the polarity of the AC source is switched, and when ON and OFF operation of the pair of first and third switching elements and ON and OFF operation of the pair of second and fourth switching elements are switched, switching cycles and on-duty of the pairs, which perform ON and OFF operation so as to have on-duty to control the PFC voltages during a half cycle before polarity of the AC source is switched, are adjusted; 3) pulse signals that drive the first to fourth switching elements are controlled so that resonance voltages and resonance current that have the same polarity are not continuously input to the high frequency transformer during the whole cycle of the AC source.

In the first aspect of the present invention, the switching controller performs that: 1) in the positive half cycle of the AC source, either one of the second switching element or the fourth switching element is firstly selected so as to perform ON operation in advance, and the switching element that has not been selected is secondly selected so as to perform ON operation with a half cycle delay of a switching cycle relative to the firstly selected switching element; 2) in the negative half cycle of the AC source, either one of the first switching element or the third switching element is firstly selected so as to perform ON operation in advance, and the switching element that has not been selected is secondly selected to so as to perform ON operation with a half cycle delay of a switching cycle relative to the firstly selected switching element; 3) after polarity of the AC source has been switched, ON and OFF operation of the pair of first and the third switching elements and ON and OFF operation of the pair of second and fourth switching elements are switched; 4) considering the firstly selected switching element in the pairs that performs ON and OFF operation so as to have on-duty that controls the PFC voltages during a half cycle before polarity of AC source is switched, a switching cycle where the polarity switch of the AC source has been passed, and a next ON operation is started is set to a half cycle; 5) after the half cycle has been passed, ON and OFF operation of the firstly selected switching elements and ON and OFF operation of the secondly selected switching elements that complementarily perform ON and OFF operation relative to the firstly selected switching elements are switched; 6) considering the secondly selected switching element in the pairs, a half cycle from which the firstly selected switching element starts a next ON operation is set to OFF period; 7) on-duty of a next half cycle following the OFF period is set to 100%; and 8) after the half cycle has been passed, the ON and OFF operation of the firstly selected switching element and the ON and OFF operation of the secondly selected switching element that complementarily performs ON and OFF operation relative to the firstly selected switching element are switched.

In the first aspect of the present invention, the switching controller performs the following process: 1) an A/D conversion process by which signals output from the PFC voltage detector and signals output from the output voltage detector are each A/D converted; 2) an operation process that compute control frequencies and on-duty of pulse signals that drive the first to fourth switching elements based on the A/D converted signals; 3) an output limit process that restricts the control frequencies and the on-duty obtained by the operation process within a predetermined range fitted by an upper and a lower limit; and 4) a PWM output process that produces and outputs pulse signals which drives the first to fourth switching elements based on the control frequencies and the on-duty that have been restricted through the output limit process, wherein the PWM output process includes a PWM output control process where: A) signals output from the polar detector is input so as to decide whether polarity of the AC source is switched; B) after polarity of the AC source is passed, and when ON and OFF operation of the pair of first and third switching elements and ON and OFF operation of the pair of second and fourth switching elements are switched, the switching cycles and on-duty of the pair that has been performing ON and OFF operation to obtain on-duty controlling the PFC voltages during a half cycle before polarity of the AC source is changed are adjusted; and C) pulse signals that drive the first to fourth switching elements are controlled so that resonance voltages and resonance current that have the same polarity are not continuously input to the high frequency transformer during the whole cycle of the AC source.

In the first aspect of the present invention, the PWM output control process includes an output switching decision process that decides polarity switch of the AC source, the output switching decision process including the following processes: 1) when decided that polarity of the AC source is switched, switching cycles and on-duty of the pair that have been performing ON and OFF operation so as to obtain on-duty controlling the PFC voltages during a half cycle before polarity of the AC source is switched are adjusted so as to set switching flag, and 2) when decided that polarity of the AC source is not switched, decision is then made whether or not the switching flag is set, and if the switching flag is set, pulse signals that drive the pair of first and third switching elements and pulse signals that drive the pair of second and fourth switching elements are switched.

BRIEF DESCRIPTION OF THE DRAWINGS

FIG. 4 is a flow chart that shows the control method of the switching power unit according to one embodiment of the present invention, which is applied to the switching controller of FIG. 3;

DETAILED DESCRIPTION OF THE PREFERRED EMBODIMENTS

Figure 1:
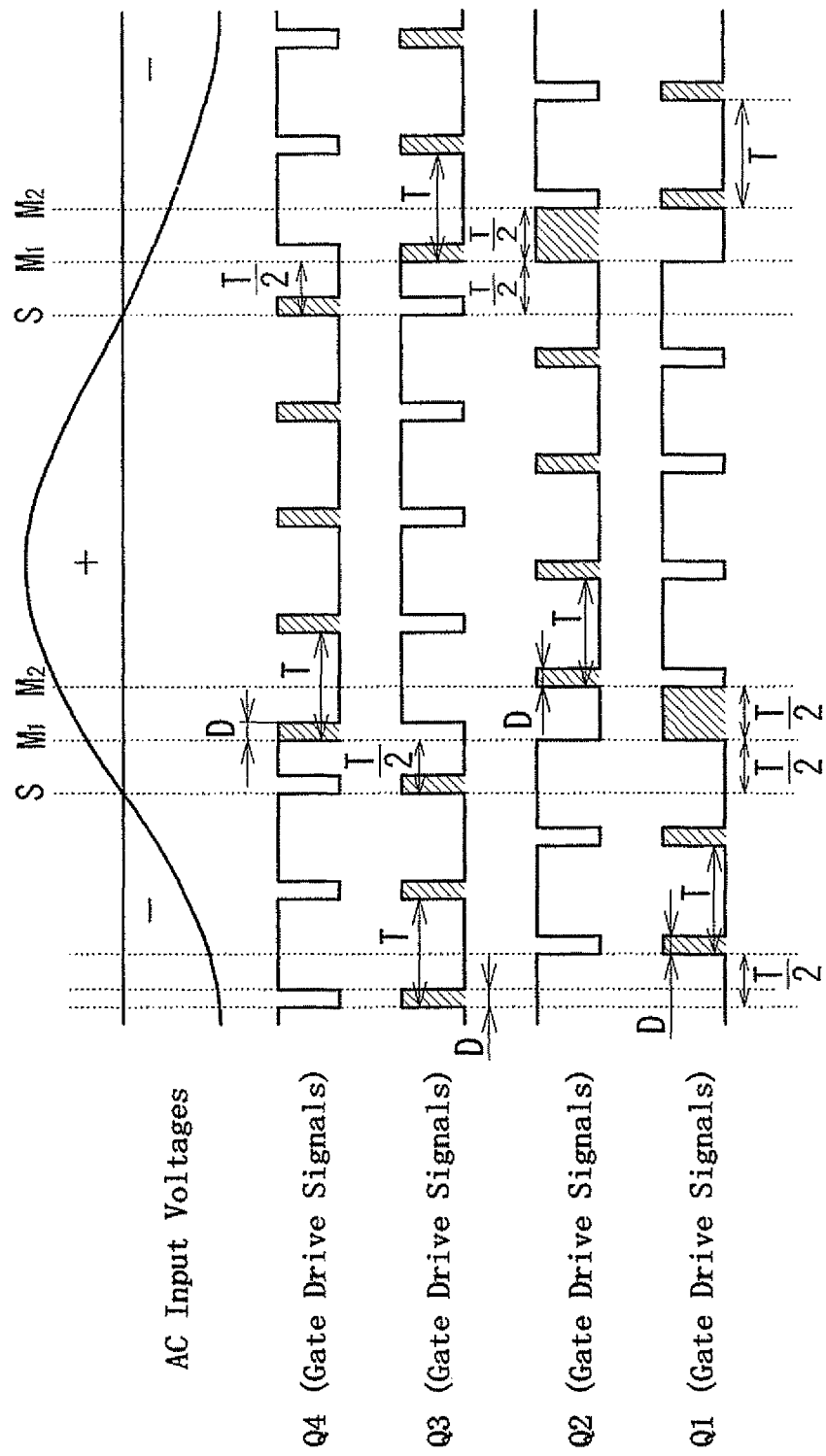
FIG. 1 is a timing chart that shows a method for controlling a switching power unit according to one embodiment of the present invention.
Figure 9:
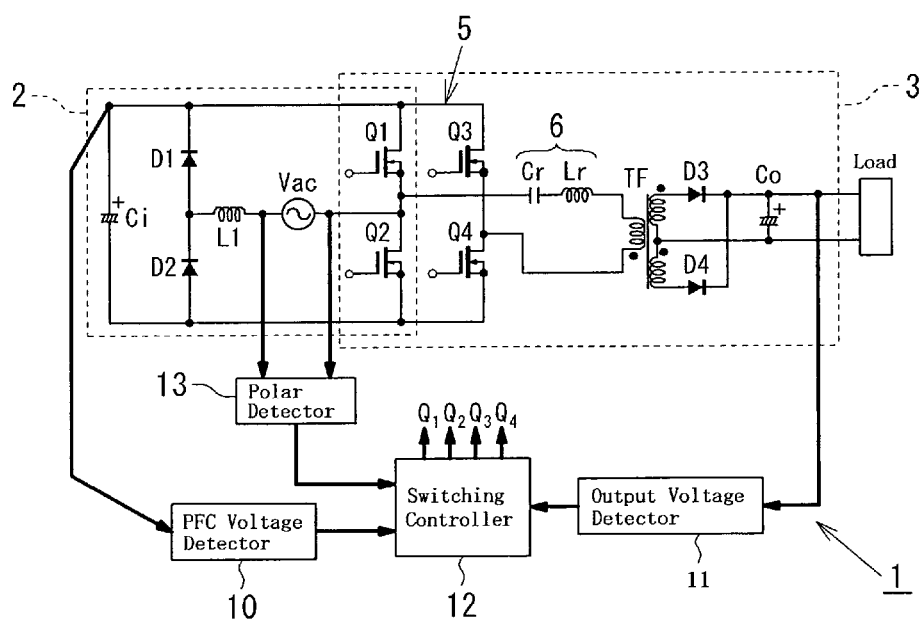
FIG. 9 is a block diagram that exemplifies the structure of an AC/DC converter circuit which is a main portion of a switching power unit where a full-wave rectifier bridge is eliminated, and a power-factor correction unit and the switching elements of a current resonance converter unit are shared.

Preferred embodiments of the present invention will be described with reference to the accompanying drawings. FIG. 1 is a timing chart that shows a method for controlling a switching power unit according to one embodiment of the present invention. In this embodiment, the control method of the switching power unit of the present invention is applied to a switching power unit where an AC/DC converter circuit 1 shown in FIG. 9 is a main portion. Circuit elements and circuit structures to be hereinbelow explained will be the same with the AC/DC converter circuit 1 of FIG. 9.

In FIG. 1, gate drive signals are applied to each of the gates of first to fourth switching elements Q1 to Q4, and drive controls of the switching elements according to the embodiment of the present invention are shown. Here, an "AC input voltage" means the voltage of an AC source Vac. Further, in the below explanation, while the side of the intermediate point at the first and second switching elements Q1, Q2 is positive, this condition will be called as that the polarity of the AC source Vac is a positive half cycle. On the other hand, while the side of the intermediate point at the first and second switching elements Q1, Q2 is negative, this condition will be called as that the polarity of the AC source is a negative half cycle. Considering the waveform of an "AC input voltage" shown in FIG. 1, a half cycle marked by "+" and a half cycle marked by "−" are the positive half cycle and the negative half cycle of the AC source, respectively.

The present invention obtains specific features relating to the drive control of each of the switching elements Q1 to Q4 at the time that the polarity of the AC source Vac is switched. Here, however, controls between the starting point of the switched control (point S in FIG. 1) and the switched point (a point $M_2$ of FIG. 1 in case of the first/second switching elements Q1, Q2, and a point $M_1$ of FIG. 1 in case of the third/fourth switching elements Q3, Q4) will be considered later. At first, the drive control of the first to fourth switching elements Q1 to Q4 that realizes the basic operation of a power-factor correction unit 2 and a current resonance converter unit 3 is hereinafter explained. Considering the basic operation of the power-factor correction unit 2 and the current resonance converter unit 3, the operation of the first to fourth switching elements Q1 to Q4 to be explained in regard of the operation of the positive and negative half cycles of the AC source Vac is, unless otherwise specifically indicated, regarded as operations where a predetermined cycle at the time the polarity of the AC source Vac is switched is excluded form each of the half cycles (that is, a period $M_1$–$M_2$ in case of the first/second switching elements Q1, Q2, and a period S–$M_1$ in case of the third/fourth switching elements Q3, Q4).

The power-factor correction unit 2 is composed of a dual boost converter circuit as that voltages at both ends of a first smoothing capacitor Ci are used for output voltages (hereinafter referred to as the "PFC voltages"). Based on the voltages output from a PFC voltage detector 10, the PFC voltages are subjected to a pulse width modulation (PWM) control. Focusing on the function of the power-factor correction unit 2 as discussed hereinabove, the operation of the first/second switching elements Q1, Q2 can be explained hereinafter.

In the power-factor correction unit 2, during the positive half cycle of the AC source Vac, the second switching element Q2 functions as the main switching element of the booster converter circuit. Based on its on-duty, the PFC voltages of the power-factor correction unit 2 are subjected to the PWM control. In FIG. 1 this on-duty corresponds to the "Pulse Width (D)/Cycle (T)" of the "Q2 (gate drive signals)" in the positive half cycle of the AC input voltages. Further, in the same FIG. 1, the waveform of the "Q1 (gate drive signals)" in the positive half cycle becomes an inverted waveform, which inverts the positive/negative waveform of the "Q2 (gate drive signals)." Here, the first switching element Q1 drives so as to complementarily turn ON and OFF together with the second switching element Q2. Accordingly, the first switching element Q1 functions as a synchronizing rectifier element in the booster converter circuit. During the positive half cycle, when the second switching element Q2 is turned ON (and when the first switching element Q1 is turned OFF), energy is adapted to be stored in the booster inductor L1. On the other hand, when the second switching element Q2 is turned OFF (and, when the first switching element Q1 is turned ON), the energy that has been stored in the booster inductor L1 is sent to the first smoothing capacitor Ci. AC input voltages are then boosted, and the PFC voltages are output as voltages at both ends of the first smoothing capacitor Ci.

On the contrary, during the negative half cycle of the AC source Vac, functions of the first/second switching elements Q1, Q2 are switched relative to the positive half cycle. That is, during the negative half cycle, the first switching element Q1 functions as the main switching element. Further, based on its on-duty, the PFC voltages of the power-factor correction unit 2 are controlled. In FIG. 1, this on-duty corresponds to the "Pulse Width (D)/Cycle (T)" of the "Q1 (gate drive signals)" in the negative half cycle of the AC input voltages. Also, in the same FIG. 1, the waveform of the "Q2 (gate drive signals)" in the negative half cycle becomes an inverted waveform, which inverts the positive/negative waveforms of the "Q1 (gate drive signals)." Here, the second switching element Q2 drives so as to complementarily turn ON and OFF together with the first switching element Q1. Accordingly, the second switching element Q2 functions as a synchronizing rectifier element. During the negative half cycle, when the first switching element Q1 is turned ON (and when the second switching element Q2 is turned OFF), energy is adapted to be stored in the booster inductor L1. On the other hand, when the first switching element Q1 is turned OFF (and, when the second switching element Q2 is turned ON), the energy that has been stored in the booster inductor L1 is sent to the first smoothing capacitor Ci. AC input voltages are then boosted, and the PFC voltages are output as voltages at both ends of the first smoothing capacitor Ci.

In the current resonance converter unit 3, the PFC voltages of the power-factor correction unit 2 is input. The input voltages are then converted into high frequency voltages by switching the full-bridge circuit 5 that is composed of the first to fourth switching elements Q1 to Q4. The high frequency voltages are then applied to both ends of the primary winding of the high frequency transformer TF. After that, high frequency voltages that are generated at the secondary side of the high frequency transformer TF are rectified and smoothed by means of the rectifier diodes D3, D4 and the second smoothing capacitor Co thereby obtaining predetermined DC output voltages (voltages at both ends of the second smoothing capacitor Co). The current resonance converter unit 3 is adapted to perform soft switching operations through resonance operations between the full-bridge circuit 5 composed of the first to fourth switching elements Q1 to Q4, and the series resonant circuit 6 composed of the resonance capacitor Cr and the resonance inductor Lr provided on the primary side of the high frequency transformer TF. In the current resonance converter unit 3 that has such a series resonance circuit 6, the switching cycles of the full-bridge circuit 5 are generally modified based on its gain property so as to control the output voltages. On the other hand, in the AC/DC converter circuit 1, based on the output voltages of the output voltage detector 11, the output voltages are subjected to the Pulse Frequency Modulation (PFM). Based on the function of the current resonance converter unit 3, the first to fourth switching elements Q1 to Q4 can be explained as following.

During the positive half cycle of the AC source Vac, the fourth switching element Q4 drives so as to have the same on-duty with the second switching element Q2 which has the on-duty that controls the PFC voltages during this cycle. As shown in FIG. 1, the pulse width D and the switching cycle T of the "Q4 (gate drive signals)" in the positive half cycle of the AC source Vac become the same with the pulse width D and the switching cycle T of the "Q2 (gate drive signals)." Here, however, among the pair of switches composed of the second and fourth switching elements Q2, Q4, the fourth switching elements Q4 should be turned ON in advance of the second switching element Q2. On the other hand, the second switching element Q2 is controlled to turn ON with the delay of the half cycle (T/2) of the switching cycle T relative to the ON operations of the fourth switching element Q4. Further, as shown in FIG. 1, the wave formation of the "Q3 (gate drive signals)" in the positive half cycle becomes a reversed waveform, which reverses the positive and negative waveforms of the "Q4 (gate drive signals)." The third switching element Q3 drives to complementarily turn ON and OFF together with the fourth switching element Q4.

Based on the above construction, a condition where the first/fourth switching elements Q1, Q4 are turned ON (and, the second/third switching elements Q2, Q3 are turned OFF) and a condition where the second/third switching elements Q2, Q3 are turned ON (and, the first/fourth switching elements Q1, Q4 are turned OFF) repeat alternatively to each other in every half cycle (T/2) of the switching cycle. By this switching operation of the full-bridge circuit 5, the PFC voltages are converted into high frequency voltages with the cycle of T.

On the other hand, during the negative half cycle of the AC source Vac, the third switching element Q3 drives so as to obtain the same on-duty with the first switching element Q1 which has on-duty that controls the PFC voltages during this cycle. As shown in FIG. 1, the pulse width D and the switching cycle T of the "Q3 (gate drive signals)" in the positive half cycle of the AC source Vac becomes the same with the pulse width D and the switching cycle T of the "Q1 (gate drive signals)." Here, however, among the pair of switches composed of the first and third switching elements Q1, Q3, the third switching elements Q3 is to turn ON in advance of the first switching element Q1. On the other hand, the first switching element Q1 is controlled to turn ON with the delay of the half cycle (T/2) of the switching cycle T relative to the ON operation of the third switching element Q3. Further, as shown in FIG. 1, the waveform of the "Q4 (gate drive signals)" in the positive half cycle becomes a reversed waveform, which reverses the positive and negative waveforms of the "Q3 (gate drive signals)." The fourth switching element Q4 drives to turn ON and OFF together with the third switching element Q3.

Based on the above construction, as the same with the positive half cycle, a condition that the first/fourth switching elements Q1, Q4 are turned ON (and, the second/third switching elements Q2, Q3 are turned OFF) and a condition that the second/third switching elements Q2, Q3 are turned ON (and, the first/fourth switching elements Q1, Q4 are turned OFF) repeat alternatively to each other in every half cycle (T/2) of the switching cycle. By this switching operation of the full-bridge circuit 5, the PFC voltages are converted into high frequency voltages with the cycle of T.

Here, in the AC/DC converter circuit 1, as discussed hereinabove, considering the positive half cycle of the AC source Vac, the on-duty of the fourth switching element Q4 is operated so as to be the same with the on-duty of the second switching element Q2. On the other hand, in the negative half cycle, the on-duty of the third switching element Q3 is operated so as to be the same with the on-duty of the first switching element Q1. Accordingly, it would be possible to make the output voltages of the full-bridge circuit 5 to have symmetric pulse waveforms. Hereinbelow, switching elements that drive to have on-duty to control the PFC voltages are called as the "control gate" (that is, the second/fourth switching elements Q2, Q4 in the positive half cycle, and the first/third switching elements Q1, Q3 in the negative half cycle).

Figure 2:
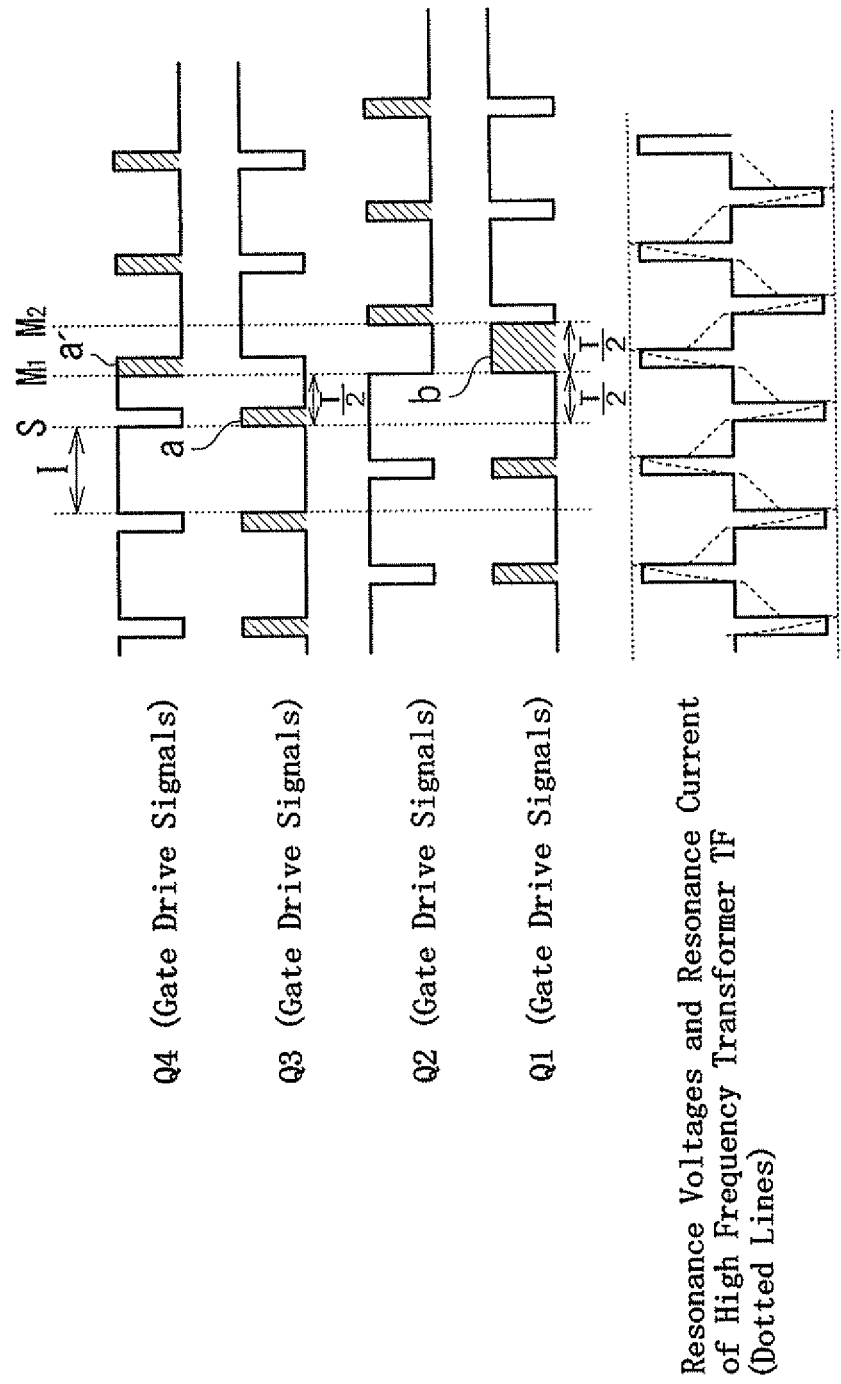
FIG. 2 is a timing chart that shows one example relating to the drive control of switching elements at a switching point of positive and negative half cycles of an AC source in the control method of the switching power unit of FIG. 1.

Next, with reference to FIG. 2, the drive control of the first to fourth switching elements Q1 to Q4 at the time that the polarity of the AC source Vac is switched will be explained hereinbelow. FIG. 2 is a timing chart that shows one example of such a drive control.

Figure 10:
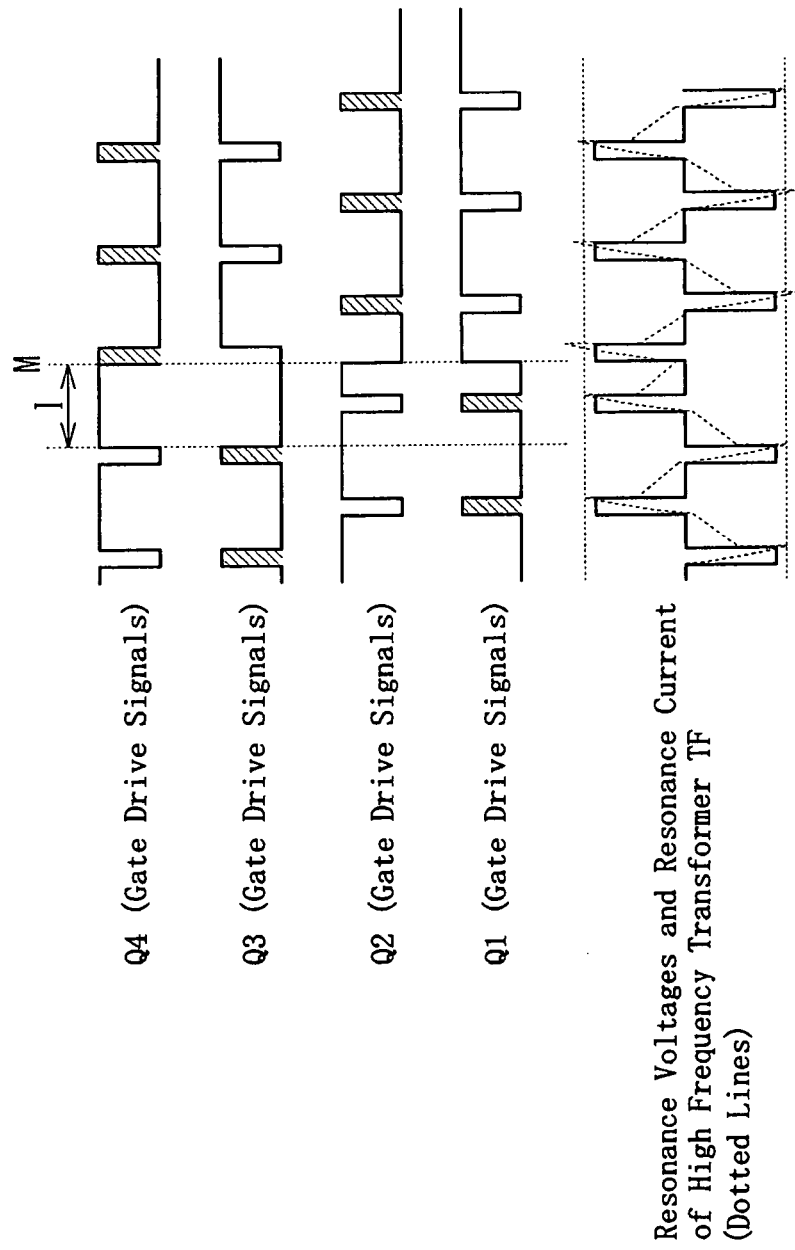
FIG. 10 is a timing chart that shows one example of the normally-assumed drive control of switching elements at the switching time of positive and negative half cycles of an AC power supply in the AC/DC converter circuit of FIG. 9.

FIG. 2, as the same with the FIG. 10, is an example that polarity is switched from the negative half cycle to the positive half cycle of the AC source Vac. In the FIG., drive controls for switching the control gate are shown. Considering the drive controls of FIG. 2, the starting point of a new one cycle following the completed one cycle of a switching cycle that includes a point where the polarity of the AC source Vac is switched is determined as a starting point S where the switching of the control gate is operated (that is, in this case, the polar switching of the AC source Vac occurs at any time in the completed one cycle before the starting point S (for example, at any time during a period I)). This drive control can be explained as below.

That is, in control gates during half cycles (in this case, the negative half cycle) prior to a point that the polarity of the AC source Vac is switched, the switching element on the side where ON operation is performed in advance (in this case, the third switching element Q3) will be discussed. Here, a switching cycle that a next ON operation starts following the starting point S by which the polarity of the AC source Vac is switched (corresponding to Pulse a in FIG. 2) is set to a half cycle (T/2). A point where this half cycle has been passed is set to a first switching point $M_1$. Gate drive signals that have been output to a switching element (in this case, the third switching element Q3) on the side where ON operation has been performed in advance in the negative half cycle are switched from the first switching point $M_1$ to a switching element (in this case, the fourth switching element Q4) where ON and OFF operations have been performed in a complementary relation to the switching element (Q3). Accordingly, both of the switching elements (in this case, the third switching element Q3 and the fourth switching element Q4) can be switched from ON to OFF, or vice versa.

Further, in control gates during half cycles (in this case, the negative half cycle) prior to a point where the polarity of the AC source Vac is switched, a switching element (in this case, the first switching element Q1) on the side where ON operation is performed with a delay of a half cycle (T/2) will be discussed. In this switching element, a half cycle (T/2) from the starting point S is set to an OFF period. However, the on-duty of a next half cycle (T/2) following this OFF period is set to 100% (corresponding to Pulse b of FIG. 2). A point where this half cycle has been passed is set to a second switching point $M_2$. Gate drive signals that have been output to a switching element (in this case, the first switching element Q1) on the side where ON operation is performed with a delay in the negative half cycle are switched from the second switching point $M_2$ to a switching element (in this case, the second switching element Q2) where ON and OFF operations have been complementarily performed together with the first switching element Q1. Accordingly, both of the switching elements (in this case, the first switching element Q1 and the second switching element Q2) can be switched from ON to OFF, or vice versa.

Accordingly, in the operation sequence of the full-bridge circuit 5, right before the starting point S, the first/fourth switching elements Q1, Q4 are tuned ON (and, the second/third switching element Q2, Q3 are turned OFF). On the other hand, after the half cycle (T/2) has been passed, at the starting point S, the second/third switching elements Q2, Q3 are turned ON (and, the first/fourth switching elements Q1, Q4 are turned OFF) (In FIG. 2, the period corresponding to the pulse width of the Pulse a). After the half cycle (T/2) has been passed, at the first switching point $M_1$, the first/fourth switching elements Q1, Q4 are again turned ON (and, the second/third switching elements Q2, Q3 are tuned OFF) (In FIG. 2, the period corresponding to the pulse width of Pulse a). After this, basic operations relating to the positive half cycle will repeat.

As shown in FIG. 2, in this drive control, the switching cycle and the on-duty of the control gates (in this case, the first/third switching elements Q1, Q3) during the half cycle (in this case, the negative half cycle) before the polarity of the AC source Vac is switched are adjusted. Accordingly, around a period where the polarity of the AC source Vac is switched from the negative half cycle to the positive half cycle, ON and OFF controls of the switching elements are performed so that high frequency voltages to be applied to the primary winding of the high frequency transformer TF become symmetrical in a positive and negative relation. That is, in this drive control, at a point where the polarity of the AC source Vac is switched, there is no case that resonance voltages and resonance current that have the identical polarity will be not continuously input to the high frequency transformer TF. Instead, the switching of the control gates are performed as that the resonance voltages and the resonance currents that repeat switching of positive and negative polarities at a constant period are input.

Here, in FIG. 2, the case that polarity is switched from the negative half cycle to the positive half cycle of the AC source Vac (that is, when the control gates are switched from the first/third switching elements Q1, Q3 to the second/fourth switching elements Q2, Q4) is exemplified. However, as shown in FIG. 1, also when the polarity is switched from the positive half cycle to the negative half cycle of the AC source Vac (that is, when the control gates are switched from the second/fourth switching elements Q2, Q4 to the first/third switching elements Q1, Q3), the same drive control becomes operable (FIG. 1 shows as that the point where the polarity of the AC source Vac is switched corresponds to the starting point S. However, this only simplifies that the polarity switching of the AC source Vac occurs right before completion of the one cycle of the switching cycle).

Based on the above, even though the polarity of the AC source Vac is switched, the core vibration of the high frequency transformer TF caused by which large excitation current briefly flows to the high frequency transformer TF does not occur at audio frequency bands. Accordingly, it can effectively reduce or eliminate noises generated from the high frequency transformer TF.

Next, with reference to FIGS. 3 to 5, the structure of a switching controller 12 to which the control method of the switching power unit according to the present invention (the drive control method of the first to fourth switching elements Q1 to Q4) is applied, and the preferred examples of the drive control procedure of the first to fourth switching elements Q1 to Q4 by means of the switching controller 12 will be hereinafter explained. The switching controller 12 is composed as a digital control device with a programmable device such as a microcomputer, DSP, FPGA, etc. As shown in the functional block of FIG. 3, the switching controller 12 is composed of: a PFC voltage A/D converter 21 to which output signals from the PFC voltage detector 10 is input; an output voltage A/D converter 22 to which output signals from the output voltage detector 11 is input; a PID operator 23; an output limiter 24; and a PWM output processor 25. Further, the PWM output processor 25 has each functional block that is composed of: a voltage polar detector 26 to which output signals from the polar detector 13 is input; a PWM output controller 27; a switch element drive circuit 28. Still further, each functional block of the switching controller 12 is applicable by an optionally-selected appropriate hardware or software, or its combination, as long as the following control procedures to be explained hereinafter are executed.

Considering the switching controller 12, as shown in FIG. 4, after its control is started, a predetermined initial setting is executed (Step S11). Following the step, output signals from the PFC voltage detector 10 and output signals from the output voltage detector 11 are subjected to an A/D conversion by means of the PFC voltage A/D converter 21 and the output voltage A/D converter 22. Accordingly, PFC voltage data and output voltage data that are digital data will be produced (the control waits for completion of the A/D conversion as long as No is kept at Step S12 loop). Following completion of the A/D conversion (Yes at Step S12), the control is shifted to the PID operator 23. At the PID operator 23, based on the PFC voltage data and the output voltage data that have been converted at the Step S12, control frequencies and on-duty are calculated by PID operations (Step S13).

Next, the control is shifted to the output limiter 24. Control frequencies and on-duty that have been obtained through operations at the Step S13 are limited to a predetermined range fitted by an upper and a lower limit. Specifically, at Step S14, control frequencies that have been obtained at Step S13 are determined whether they exceed a predetermined maximum value (MAX). If the value exceeds (Yes), this predetermined maximum value (MAX) is set to control frequencies (Step S15), and the control is shifted to Step S18. Further, at Step S14, if the control frequencies that have been obtained at Step S13 do not exceed (NO) the predetermined maximum value (MAX), the control frequencies are determined whether they are below a predetermined minimum value (MIN) at Step S16. If the control frequencies are below the predetermined minimum value (Yes), the value is set to the control frequencies (Step S17). Following the step, the control is shifted to Step S18. Further, at Step S16, if the control frequencies that have been obtained at Step S13 are not below (NO) the predetermined minimum value (MIN), value that has been obtained at Step S13 is set to the control frequencies. After this, the control is shifted to Step S18. Then, at Steps S18 to S21, the same procedures that have been taken at the steps S14 to S17 are to be executed relative to on-duty obtained at Step S13.

Next, the control is shifted to the PWM output processor 25. Based on the control frequencies and the on-duty that have been set by the PID operator 23 and the output limiter 24, the PWM output processor 25 will produce pulse signals (gate drive signals) that drive the first to fourth switching elements Q1 to Q4. The pulse signals are then output to each of the switching elements Q1 to Q4 (Step S22). Through the above procedures, one cycle of PWM output processes are made completed, and processes of Steps S12 to S22 will be repeated.

As discussed hereinabove, in the AC/DC converter circuit 1, the PFC voltages are controlled to obtain predetermined voltages by means of the PWM control. At the same time, the output voltages are controlled by means of the PFM control based on gain properties of the series resonance circuit. Accordingly, it makes possible to control the PFC voltages and the output voltages based on different modulation methods, contributing to effective controls over the first to fourth switching elements Q1 to Q4.

Figure 3:
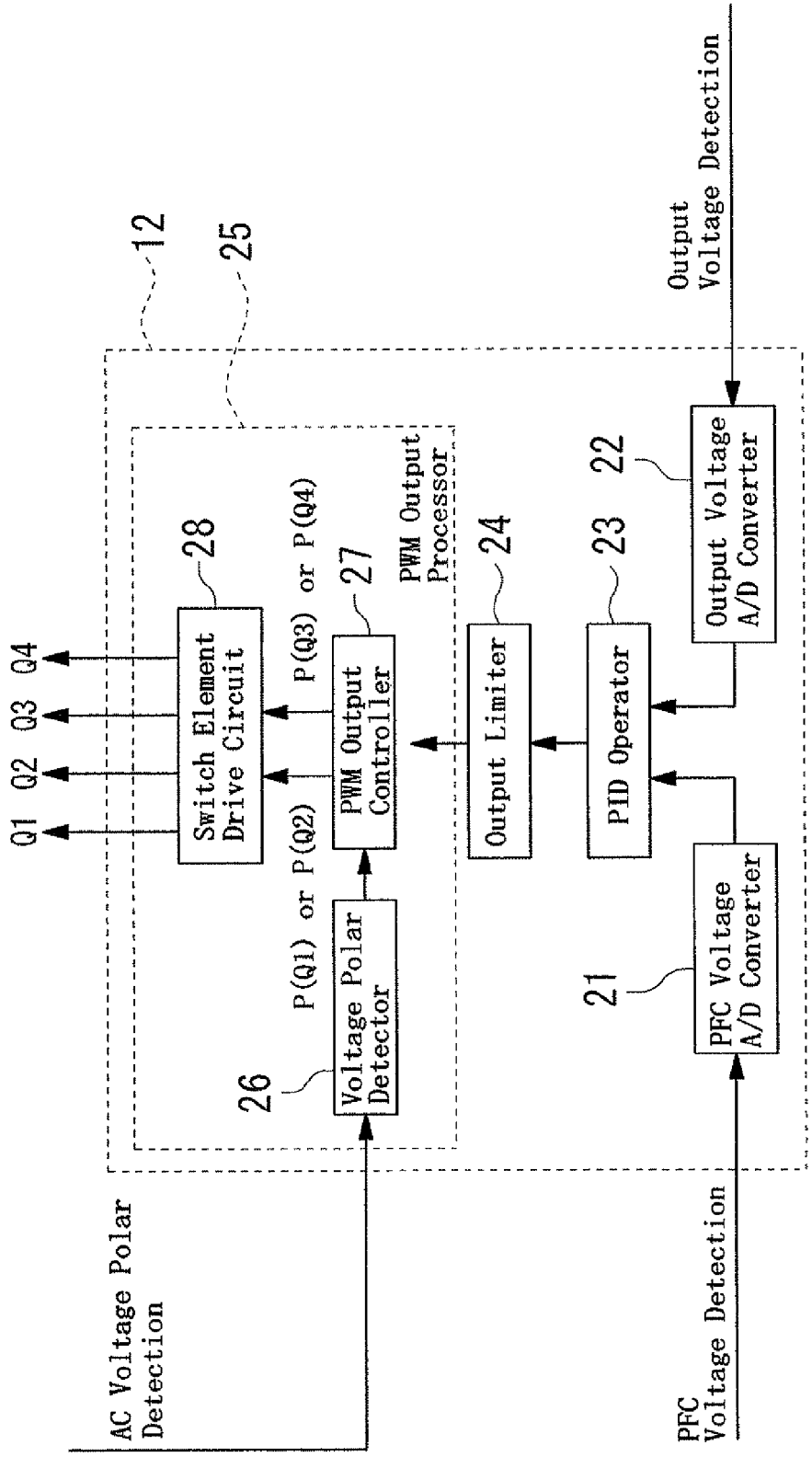
FIG. 3 is a functional block diagram that exemplifies the structure of a switching controller to which the control method of the switching power unit according to one embodiment of the present invention is applied.
Figure 5:
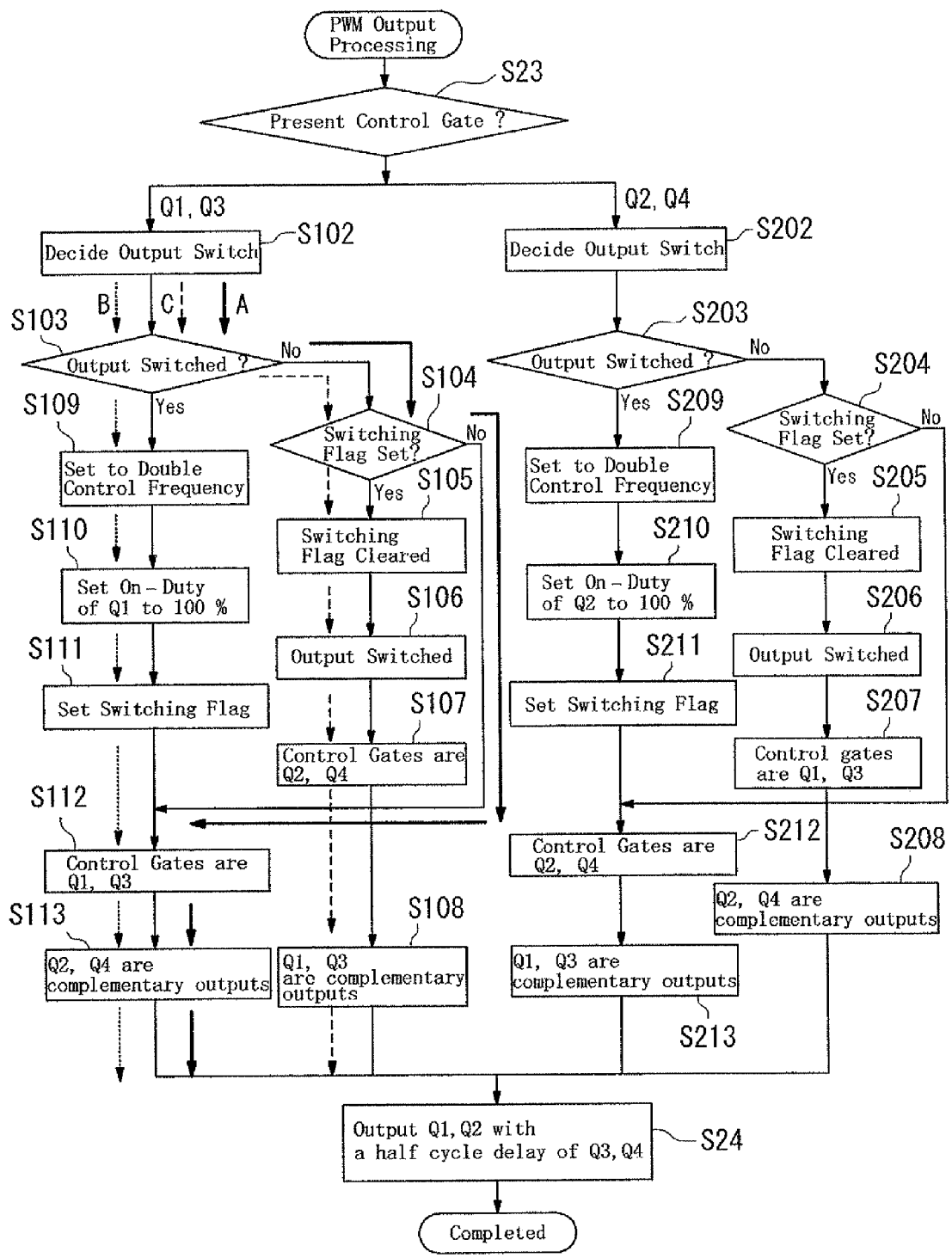
FIG. 5 is a flow chart that shows PWM output processes in detail based on the flow chart of FIG. 4.

With reference to FIG. 3 and FIG. 5, the operation of the PWM output processor 25 will be explained in detail. At the PWM output controller 27, output signals that indicate the polarity of the AC source Vac are input from the voltage polar detector 26. Based on the output signals, the PWM output controller 27 will be determined whether a present status is the positive half cycle or the negative half cycle. Further, for example, in comparison with proximate conditions, the PWM output controller 27 will also be determined whether its polarity is switched from the negative half cycle to the positive half cycle (or, from the positive half cycle to the negative half cycle). The PWM output controller 27 will be determined at first whether a present control gate is whether the first/third switching elements Q1, Q3 or the second/fourth switching elements Q2, Q4 (Step S23). In case that the present control gate is the first/third switching elements Q1, Q3, Steps S102 to S113 are executed. On the other hand, in case of the second/fourth switching elements Q2, Q4, Steps S202 to S213 are executed.

Here, for example, a present gate is determined as the first/third switching elements Q1, Q3, Step S102 will be determined at first whether the polarity of the AC source Vac is switched. Through this processes, necessity to switch the control gates (for example, the switch of the output of the gate drive signals) will be determined. Here, if determined that the process to switch the control gate should start (that is, if determined that polarity should be switched now from the negative half cycle to the positive half cycle of the AC source Vac) (Yes oat Step S103), the control is shifted to Step S109. The first half of control procedures that switch the control gate is executed along a route B.

At these control procedures, control frequencies are set to double at Step S109. The switching cycles then become the half cycle (T/2) of the original switching cycle T. At Step S110, the on-duty of the first switching element Q1 is set to be 100%. Next, at Step S111, a switch procedure flag that shows the execution of switch procedures in progress is set. After that, the control gate is set to the first/third switching elements Q1, Q3 while remaining the present status (Step S112). The output of the gate drive signals relative to the second/fourth switching elements Q2, Q4 are set to be the complementary output of the output of the gate drive signals relative to each of the first and third switching elements Q1 and Q3 (Step S113).

Next, at Step S24, the gate drive signals of the first switching element Q1 is set to be delayed with the half cycle (T/2) of the original switching cycle T relative to the gate drive signals of the third switching element Q3. Then, command signals P (Q1) relating to the gate drive signals of the first switching element Q1 and command signals P (Q3) relating to the gate drive signals of the third switching element Q3 are output from the PWM output controller 27 to the switch element drive circuit 28. The switch element drive circuit 28 will, based on the command signals P (Q1) and P (Q3), produce the gate drive signals of the first/third switching elements Q1, Q3, and the gate drive signals of the second/fourth switching elements Q2, Q4 that are in a complementary relation to each other. These gate drive signals are output to the first to fourth switching elements Q1 to Q4.

Based on the above, at the third switching element Q3, the ON operation (Pulse a) during the half cycle (T/2) to which the control frequencies are set double can be realized from the starting point S shown in FIG. 2 to the first switch point $M_1$. Considering the first switching element Q1, ON operations (Pulse b) that are delayed with the half cycle (T/2) of the original switching cycle T are actualized at OFF period, which is from the starting point S to the first switch point $M_1$. Further, ON operations (Pulse b) to which control frequencies are set double and that on-duty is set to 100% are also actualized at the half cycle (T/2) from the first switch point $M_1$ to the second switch point $M_2$.

On the other hand, at Step S102, if determined that the switching treatment of the control gate is not needed to start (that is, if determined that at this time the polarity switch from the negative half cycle to the positive half cycle of the AC source Vac does not occur) (No at Step S103), the control will be shifted to S104 so as to determine whether the switching flag is set. If determined that the switching flag is set (that is, at present moment, the switching process of the control gate is now executing) (Yes), the control is shifted to Step S105. Following this step, along a route C, the later half procedure of the switching process of the control gate will be executed (Here, at this time, through Steps S12 to S21 (FIG. 4) to be executed right before PWM output treatment S22 where control procedures along the route C is executed, control frequencies and on-duty are set to appropriate values based on PFC voltages and output voltages at this specific point of time).

Considering these control procedures, at Step S105, in order to indicate that the switching processes have been completed, the switching flag is made clear. Then, the gate drive signals that have been output to the first switching element Q1 are output to the second switching element Q2. Further, output is switched so that gate drive signals that have been output to the third switching element Q3 are now switched to output to the fourth switching element Q4. Accordingly, the second/fourth switching elements Q2, Q4 are set to the control gate. Further, the output of the gate drive signals relative to the first/third switching elements Q1, Q3 are set to be the complementary output of the gate drive signals relative to each of the second/fourth switching elements Q2, Q4 (Steps S106 to S108).

Next, at Step S24, the gate drive signals of the second switching element Q2 are set to be delayed with the half cycle (T/2) relative to the gate drive signals of the fourth switching element Q4. A command signal P (Q2) relating to the gate drive signals of the second switching element Q2 and a command signal P (Q4) relating to the gate drive signals of the fourth switching element Q4 are output from the PWM output controller 27 to the switch element drive circuit 28. Based on the command signals P(Q2) and P (Q4), the switch element drive circuit 28 will generate the gate drive signals of the second/fourth switching elements Q2, Q4 and the gate drive signals of the first/third switching elements Q1, Q3 that are complementary to each other. These gate signals are then output to the first to fourth switching elements Q1 to Q4.

Accordingly, as shown in FIG. 2, switching from the third switching element Q3 to the fourth switching element Q4 at the first switching point $M_1$, and switching from the first switching element Q1 to the second switching element Q2 at the second switching point $M_2$ are actualized. The control gate is then switched from the first/third switching elements Q1, Q3 in the negative half cycle to the second/fourth switching elements Q2, Q4 in the positive half cycle.

At Step S104, if determined that the switching flag is not set (No), control is shifted to Step S112, and along a route A, basic operations in the negative half cycle of the AC source Vac are to be operated. Operations of Steps S112, S113 and S24 along the route A are the same with the operations discussed hereinabove in connection with the control procedures of the route B. Accordingly, the details thereof will be omitted. Further, in connection with the control procedures of Steps S202 to S213, the first control gate is the second/fourth switching elements Q2, Q4, and when switching processes are executed, the control gate is switched to the first/third elements Q1, Q3. Besides the above, Steps S202 to S213 are the same with the control procedures of the Step S102 to S113. Accordingly, the details thereof will be also omitted.

Here, the structure and the control procedure of the switching controller 12 to be discussed with reference to FIGS. 3 to 5 are only one example thereof to which the control method of the switching power unit according to the present invention is applied. As long as the ON/OFF operations of the switching elements Q1 to Q4 are operated as that high frequency voltages applied to the primary winding of the high frequency transformer TF included in the current resonance converter unit 3 become symmetric to each other in a positive and negative relation around the polar switching of the AC source Vac, it may apply optional switching controllers and control procedures. For example, the switching controller is replaceable by the one with an analog circuit structure.

Figure 6:
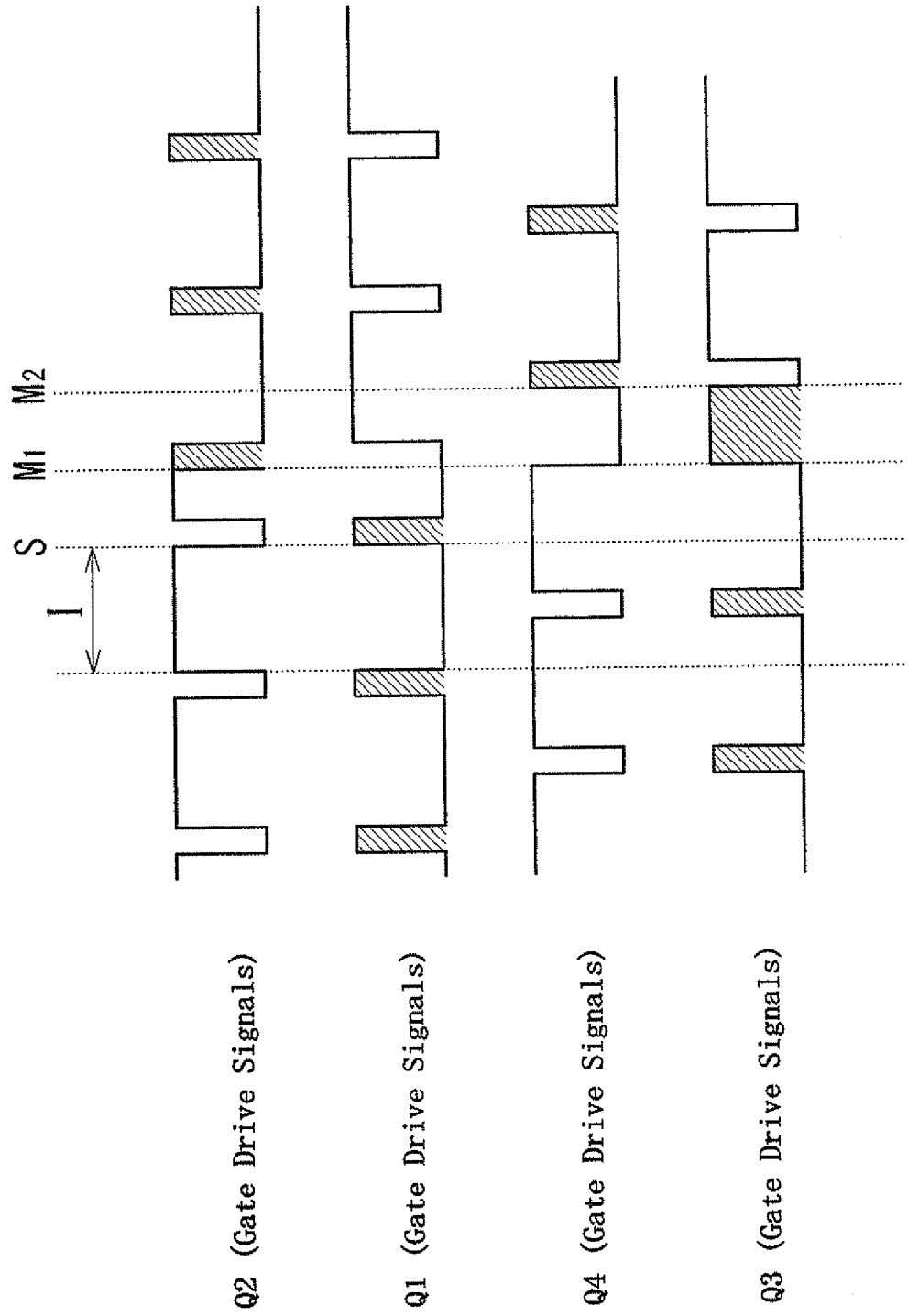
FIG. 6 is a timing chart of another example relating to the control of switching elements at the switching point of positive and negative half cycles of the AC source in the switching power unit according to one embodiment of the present invention.

Further, in the above control procedures, among the first/third switching elements Q1, Q3 and the second/fourth switching elements Q2, Q4 that compose the control gates, the switching elements that ON operation is antecedently performed are determined to be the third switching element Q3 and the fourth switching element Q4. Here, the first switching element Q1 and the second switching element Q2 are set to be delayed with the half cycle (T/2) relative to the third switching element Q3 and the fourth switching element Q4. In the control method of the switching power unit according to the embodiments of the present invention, however, the first/third switching elements Q1, Q3 and the second/fourth switching elements Q2, Q4 that compose the control gates may be structured as shown in FIG. 6. That is, the first switching element Q1 and the second switching element Q2 are made to be antecedently ON while the third switching element Q3 and the fourth switching element Q4 are made to be ON with a delay of the half cycle (T/2) relative to the first switching element Q1 and the second switching element Q2.

Figure 7:
FIG. 7 is a timing chart of yet another example relating to the control of switching elements at the switching point of positive and negative half cycles of the AC source in the switching power unit according to one embodiment of the present invention.
Figure 8:
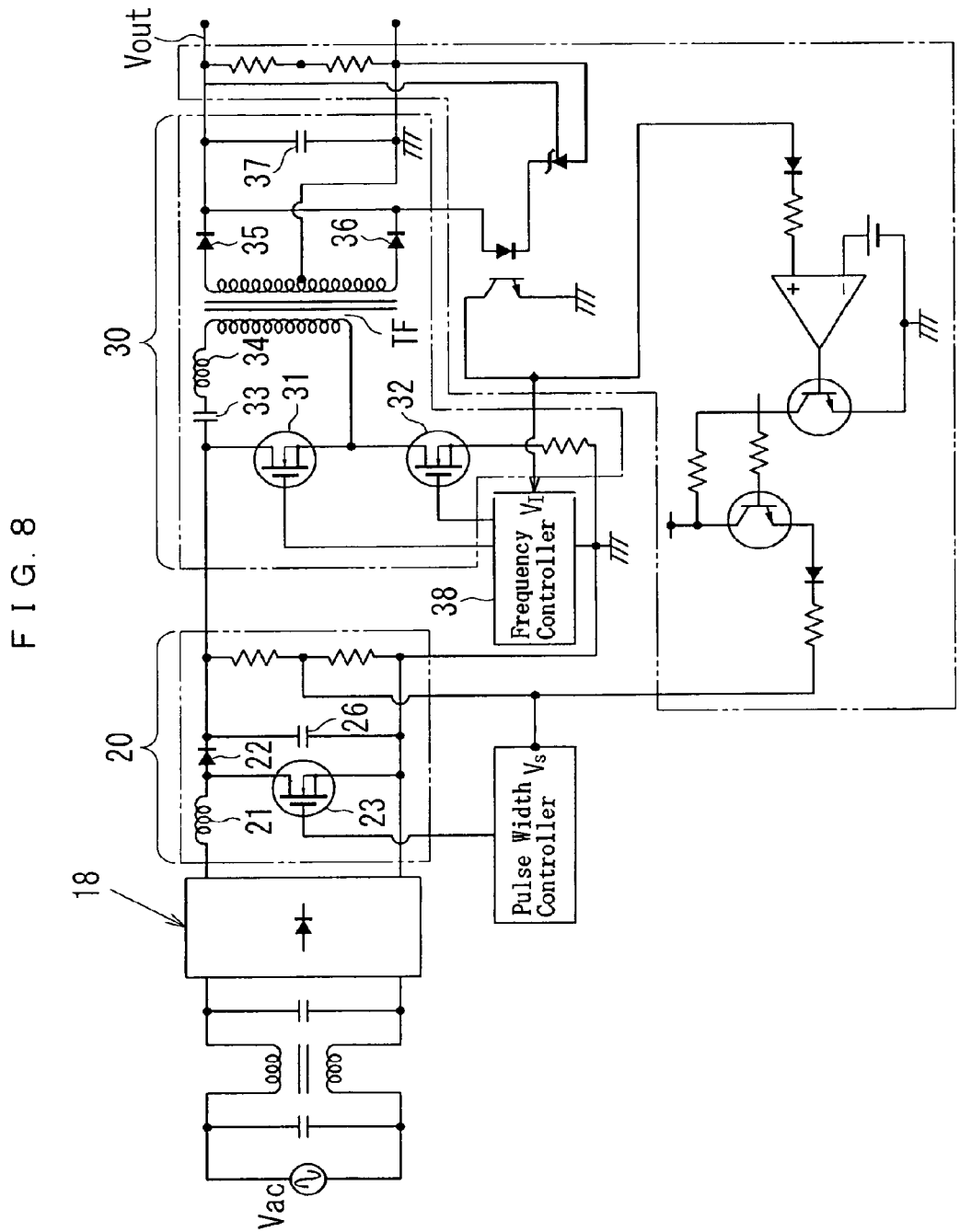
FIG. 8 is a block diagram of a conventional switching power unit that is composed of a full-wave rectifier bridge, a power-factor correction unit and current resonance converter.

Still further, as to the method for controlling the switching power unit according to the embodiment of the present invention, the first to fourth switching elements Q1 to Q4 that are composed of control gates may be, as shown in FIG. 7, performed as that: 1) from a starting point S that is switched from a negative half cycle to a positive half cycle, gate drive signals with a switching cycle T that are output to the third switching element Q3 in the negative half cycle is output to the second switching element Q2; 2) gate drive signals with a switching cycle T that are output to the first switching element Q1 in the negative half cycle are output to the fourth switching element Q4; 3) the first switching element Q1 is adapted to drive so as to complementarily perform ON and OFF operation relative to the second switching element Q2; and 4) the third switching element Q3 is adapted to drive so as to complementarily perform ON and OFF operation relative to the fourth switching element Q4.

Moreover, in the above-described embodiments of the present invention, the control methods of the switching power unit have been explained as a case that is applied to the switching power unit with the full-bridge circuit 5. However, the control method of the switching power unit according to the present invention is of course applicable to a switching power unit with a half-bridge circuit as well.

What is claimed is:

1. A method for controlling a switching power unit that converts AC input voltages of an AC source into DC voltages while improving a power-factor of the AC input voltages, the switching power unit comprising an AC/DC converter circuit that is composed of a power-factor correction unit and a current resonance converter unit, wherein at least a part of switching elements of the current resonance converter unit is shared with switching elements of the power-factor correction unit, the switching power unit includes a full-bridge type AC/DC converter circuit including: a series circuit comprising a first switching element and a second switching element, and a series circuit comprising a third switching element and a fourth switching element, the method comprising:

around a time when polarities of the AC source are switched between a positive half cycle and a negative half cycle, controlling ON-and-OFF of the switching elements as high frequency voltages applied to a primary winding of a high frequency transformer, which is a part of the current resonance converter unit, the positive half cycle and the negative half cycle being symmetrical in a positive and a negative relation, each time polarity of the AC source is switched, controlling each of a pair of first and third switching elements and a pair of second and fourth switching elements to turn ON and OFF alternately, while one pair of the switching elements has been being controlled to turn ON and OFF, controlling each of the other pair of the switching elements to complementarily turn ON and OFF relative to one pair of the switching elements that are connected in series to each other, throughout the whole cycle of the AC source, controlling pulse signals that drive the first to fourth switching elements so that resonance voltages and resonance currents, polarities of which are changed in a certain cycle, are input to the high frequency transformer, the switching power unit further comprising: a PFC voltage detector that detects PFC voltages at both ends of a first smoothing capacitor of the power-factor correction unit; an output voltage detector that detects output voltages at both ends of a second smoothing capacitor provided on a secondary side of the high frequency transformer of the current resonance converter unit; a polar detector that detects polarity of the AC source; and a switching controller by which ON and OFF operation of the first to fourth switching elements is controlled, wherein the switching controller is adapted to control the PFC voltages by changing on-duty of the first and second switching elements based on signals output from the PFC voltage detector, and the output voltages are controlled by changing switching cycles of the full-bridge circuit based on signals output from the output voltage detector.

2. The method for controlling the switching power unit according to claim 1, wherein the switching power unit includes the full-bridge type AC/DC converter circuit that is composed of the power-factor correction unit and the current resonance converter unit, which share the first switching element and the second switching element, the power-factor correction unit is composed of: the series circuit comprising the first switching element and the second switching element; a series circuit comprising a first diode and a second diode; and the first smoothing capacitor that is connected in parallel with the series circuit of the first and second switching elements, the series circuit of the first and second switching elements and the series circuit of the first and second diodes are connected in parallel to each other, a booster inductor and the AC source are connected in series between the series circuits, and the current resonance converter unit comprises: a full-bridge circuit, where the series circuit of the first and second switching elements and the series circuit of the third and fourth switching elements are connected in parallel to each other, and where the first and third switching elements are arranged on a high pressure side while the second and fourth switching elements are arranged on a low pressure side; the high frequency transformer that is driven by the full-bridge circuit; and a series resonance circuit that is connected to the primary winding of the high frequency transformer.

3. The method for controlling the switching power unit according to claim 2, wherein the switching controller performs:

1) a decision of whether the polarity of the AC source is switched based on signals output from the polar detector;

2) ON and OFF operations relative to the second switching element so as to control the PFC voltages based on the second switching element's on-duty during a positive half cycle, where an intermediate side of the series circuit of the first and second switching elements of the AC source is positive;

3) ON and OFF operations relative to the fourth switching element so as to have the same on-duty with the second switching element;

4) control over the first and third switching elements so as to complementarily perform ON and OFF operations relative to each of the second and fourth switching elements;

5) ON and OFF operations relative to the first switching element so as to control the PFC voltages based on the first switching element's on-duty during a negative half cycle, where an intermediate point of the series circuit of the first and second switching elements of the AC source is negative;

6) ON and OFF operations relative to the third switching element so as to have the same on-duty with the first switching element; and 7) control over the second and fourth switching elements so as to complementarily perform ON and OFF operations relative to each of the first and third switching elements.

4. The method for controlling the switching power unit according to claim 1, wherein the switching controller performs:

1) polarity switching of the AC source, which is decided based on signals output from the polar detector;

2) after the polarity of the AC source is switched, and when ON and OFF operation of the pair of first and third switching elements and ON and OFF operation of the pair of second and fourth switching elements are switched, switching cycles and on-duty of the pairs, which perform ON and OFF operation so as to have on-duty to control the PFC voltages during a half cycle before polarity of the AC source is switched, are adjusted;

3) pulse signals that drive the first to fourth switching elements are controlled so that resonance voltages and resonance currents that have the same polarity are not continuously input to the high frequency transformer during the whole cycle of the AC source.

5. The method for controlling the switching power unit according to claim 1, wherein the switching controller performs:

1) in the positive half cycle of the AC source, either one of the second switching element or the fourth switching element is firstly selected so as to perform ON operation in advance, and the switching element that has not been selected is secondly selected so as to perform ON operation with a half cycle delay of a switching cycle relative to the firstly selected switching element;

2) in the negative half cycle of the AC source, either one of the first switching element or the third switching element is firstly selected so as to perform ON operation in advance, and the switching element that has not been selected is secondly selected to so as to perform ON operation with a half cycle delay of a switching cycle relative to the firstly selected switching element;

3) after polarity of the AC source has been switched, ON and OFF operation of the pair of first and the third switching elements and ON and OFF operation of the pair of second and fourth switching elements are switched;

4) considering the firstly selected switching element in the pairs that performs ON and OFF operation so as to have on-duty that controls the PFC voltages during a half cycle before polarity of AC source is switched, a switching cycle where a polarity switch of the AC source has been passed, and a next ON operation is started is set to a half cycle;

5) after the half cycle has been passed, ON and OFF operation of the firstly selected switching elements and ON and OFF operation of the secondly selected switching elements that complementarily perform ON and OFF operation relative to the firstly selected switching elements are switched;

6) considering the secondly selected switching element in the pairs, a half cycle from which the firstly selected switching element starts a next ON operation is set to OFF period;

7) on-duty of a next half cycle following the OFF period is set to 100%; and 8) after the half cycle has been passed, the ON and OFF operation of the firstly selected switching element and the ON and OFF operation of the secondly selected switching element that complementarily performs ON and OFF operation relative to the firstly selected switching element are switched.

6. The method for controlling the switching power unit according to claim 1, wherein the switching controller performs the following processes:

1) an A/D conversion process by which signals output from the PFC voltage detector and signals output from the output voltage detector are each A/D converted;

2) an operation process that compute control frequencies and on-duty of pulse signals that drive the first to fourth switching elements based on the A/D converted signals;

3) an output limit process that restricts the control frequencies and the on-duty obtained by the operation process within a predetermined range fitted by an upper and a lower limit; and 4) a PWM output process that produces and outputs pulse signals which drive the first to fourth switching elements based on the control frequencies and the on-duty that have been restricted through the output limit process, wherein the PWM output process includes a PWM output control process where:

A) signals output from the polar detector are input so as to decide whether polarity of the AC source is switched;

B) after polarity of the AC source is passed, and when ON and OFF operation of the pair of first and third switching elements and ON and OFF operation of the pair of second and fourth switching elements are switched, the switching cycles and on-duty of the pair that have been performing ON and OFF operation to obtain on-duty controlling the PFC voltages during a half cycle before polarity of the AC source are changed are adjusted; and C) pulse signals that drive the first to fourth switching elements are controlled so that resonance voltages and resonance currents that have the same polarity are not continuously input to the high frequency transformer during the whole cycle of the AC source.

7. The method for controlling the switching power unit according to claim 1, wherein a PWM output control process includes an output switching decision process that decides a polarity switch of the AC source, the output switching decision process including the following processes:

1) when a decision is made that the polarity of the AC source is switched, switching cycles and on-duty of the pair, that have been performing ON and OFF operation so as to obtain on-duty controlling the PFC voltages during a half cycle before polarity of the AC source is switched, are adjusted so as to set a switching flag, and 2) when a decision is made that the polarity of the AC source is not switched, a decision is then made as to whether or not the switching flag is set, and if the switching flag is set, pulse signals that drive the pair of first and third switching elements and pulse signals that drive the pair of second and fourth switching elements are switched.

8. The method for controlling the switching power unit according to claim 2, wherein the switching controller performs the following processes:

1) an A/D conversion process by which signals output from the PFC voltage detector and signals output from the output voltage detector are each A/D converted;

2) an operation process that computes control frequencies and on-duty of pulse signals that drive the first to fourth switching elements based on the A/D converted signals;

3) an output limit process that restricts the control frequencies and the on-duty obtained by the operation process within a predetermined range fitted by an upper and a lower limit; and 4) a PWM output process that produces and outputs pulse signals which drive the first to fourth switching elements based on the control frequencies and the on-duty that have been restricted through the output limit process, wherein the PWM output process includes a PWM output control process where:

A) signals output from the polar detector are input so as to decide whether polarity of the AC source is switched;

B) after polarity of the AC source is passed, and when ON and OFF operation of the pair of first and third switching elements and ON and OFF operation of the pair of second and fourth switching elements are switched, the switching cycles and on-duty of the pair that have been performing ON and OFF operation to obtain on-duty controlling the PFC voltages during a half cycle before polarity of the AC source are changed are adjusted; and C) pulse signals that drive the first to fourth switching elements are controlled so that resonance voltages and resonance currents that have the same polarity are not continuously input to the high frequency transformer during the whole cycle of the AC source.

9. A method for controlling a switching power unit that converts AC input voltages of an AC source into DC voltages while improving a power-factor of the AC input voltages, the switching power unit comprising an AC/DC converter circuit that is composed of a power-factor correction unit and a current resonance converter unit, wherein at least a part of switching elements of the current resonance converter unit is shared with switching elements of the power-factor correction unit, the switching power unit includes a full-bridge type AC/DC converter circuit that includes the power-factor correction unit and the current resonance converter unit which share a first switching element and a second switching element, the method comprising:

around a time when polarities of the AC source are switched between a positive half cycle and a negative half cycle, controlling ON-and-OFF of the switching elements as high frequency voltages applied to a primary winding of a high frequency transformer, which is a part of the current resonance converter unit, the positive half-cycle and the negative half-cycle being symmetrical in a positive and a negative relation, the power-factor correction unit includes: a series circuit comprising the first switching element and the second switching element; a series circuit comprising a first diode and a second diode; and a first smoothing capacitor that is connected in parallel with the series circuit of the first and second switching elements, the series circuit of the first and second switching elements and the series circuit of the first and second diodes are connected in parallel to each other, a booster inductor and the AC source are connected in series between the series circuits, the current resonance converter unit comprises: a full-bridge circuit where the series circuit of the first and the second switching elements and the series circuit of the third and fourth switching elements are connected in parallel to each other, and where the first and third switching elements are arranged on a high pressure side while the second and fourth switching elements are arranged on a low pressure side; the high frequency transformer that is driven by the full-bridge circuit; and a series resonance circuit that is connected to the primary winding of the high frequency transformer, the switching power unit further comprises: a PFC voltage detector that detects PFC voltages at both ends of the first smoothing capacitor of the power-factor correction unit; an output voltage detector that detects output voltages at both ends of a second smoothing capacitor provided on a secondary side of the high frequency transformer of the current resonance converter unit; a polar detector that detects polarity of the AC source; and a switching controller by which ON and OFF operation of the first to fourth switching elements is controlled, the switching controller is adapted to control the PFC voltages by changing on-duty of the first and second switching elements based on signals output from the pre-voltage detector, and the output voltages are controlled by changing switching cycles of the full-bridge circuit based oil signals output from the output voltage detector.

10. The method for controlling the switching power unit according to claim 9, wherein the switching controller performs:

1) a decision of whether the polarity of the AC source is switched based on signals output from the polar detector;

2) ON and OFF operations relative to the second switching element so as to control the PFC voltages based on the second switching element's on-duty during a positive half cycle, where an intermediate side of the series circuit of the first and second switching elements of the AC source is positive;

3) ON and OFF operations relative to the fourth switching element so as to have the same on-duty with the second switching element;

4) control over the first and third switching elements so as to complementarily perform ON and OFF operations relative to each of the second and fourth switching elements;

5) ON and OFF operations relative to the first switching element so as to control the PFC voltages based on the first switching element's on-duty during a negative half cycle, where an intermediate point of the series circuit of the first and second switching elements of the AC source is negative;

6) ON and OFF operations relative to the third switching element so as to have the same on-duty with the first switching element; and 7) control over the second and fourth switching elements so as to complementarily perform ON and OFF operations relative to each of the first and third switching elements.

11. The method for controlling the switching power unit according to claim 10, wherein the switching controller performs:

1) polarity switching of the AC source, which is decided based on signals output from the polar detector;

2) after the polarity of the AC source is switched, and when ON and OFF operation of the pair of first and third switching elements and ON and OFF operation of the pair of second and fourth switching elements are switched, switching cycles and on-duty of the pairs, which perform ON and OFF operation so as to have on-duty to control the PFC voltages during a half cycle before polarity of the AC source is switched, are adjusted; and 3) pulse signals that drive the first to fourth switching elements are controlled so that resonance voltages and resonance currents that have the same polarity are not continuously input to the high frequency transformer during the whole cycle of the AC source.

12. The method for controlling the switching power unit according to claim 9, wherein the switching controller performs:

1) in the positive half cycle of the AC source, either one of the second switching element or the fourth switching element is firstly selected so as to perform ON operation in advance, and the switching element that has not been selected is secondly selected so as to perform ON operation with a half cycle delay of a switching cycle relative to the firstly selected switching element;

2) in the negative half cycle of the AC source, either one of the first switching element or the third switching element is firstly selected so as to perform ON operation in advance, and the switching element that has not been selected is secondly selected to so as to perform ON operation with a half cycle delay of a switching cycle relative to the firstly selected switching element;

3) after polarity of the AC source has been switched, ON and OFF operation of the pair of first and the third switching elements and ON and OFF operation of the pair of second and fourth switching elements are switched;

4) considering the firstly selected switching element in the pairs that performs ON and OFF operation so as to have on-duty that controls the PFC voltages during a half cycle before polarity of AC source is switched, a switching cycle where the polarity switch of the AC source has been passed, and a next ON operation is started is set to a half-cycle;

5) after the half cycle has been passed, ON and OFF operation of the firstly selected switching elements and ON and OFF operation of the secondly selected switching elements that complementarily perform ON and OFF operation relative to the firstly selected switching elements are switched;

6) considering the secondly selected switching element in the pairs, a half-cycle from which the firstly selected switching element starts a next ON operation is set to OFF period;

7) on-duty of a next half cycle following the OFF period is set to 100%; and 8) after the half cycle has been passed, the ON and OFF operation of the firstly selected switching element and the ON and OFF operation of the secondly selected switching element that complementarily performs ON and OFF operation relative to the firstly selected switching element are switched.

13. The method for controlling the switching power unit according to claim 9, wherein the switching controller performs the following process:

1) an A/D conversion process by which signals output from the PFC voltage detector and signals output from the output voltage detector are each A/D converted;

2) an operation process that computes control frequencies and on-duty of pulse signals that drive the first to fourth switching elements based on the A/D converted signals;

3) an output limit process that restricts the control frequencies and the on-duty obtained by the operation process within a predetermined range fitted by an upper and a lower limit; and 4) a PWM output process that produces and outputs pulse signals which drive the first to fourth switching elements based on the control frequencies and the on-duty that have been restricted through the output limit process, wherein the PWM output process includes a PWM output control process where:

A) signals output from the polar detector are input so as to decide whether polarity of the AC source is switched;

B) after polarity of the AC source is passed, and when ON and OFF operation of the pair of first and third switching elements and ON and OFF operation of the pair of second and fourth switching elements are switched, the switching cycles and on-duty of the pair that have been performing ON and OFF operation to obtain on-duty controlling the PFC voltages during a half-cycle before polarity of the AC source are changed are adjusted; and C) pulse signals that drive the first to fourth switching elements are controlled so that resonance voltages and resonance currents that have the same polarity are not continuously input to the high frequency transformer during the whole cycle of the AC source.

14. The method for controlling the switching power unit according to claim 13, wherein the PWM output control process includes an output switching decision process that decides polarity switch of the AC Source, the output switching decision process including the following processes:

1) when a decision is made that the polarity of the AC source is switched, switching cycles and on-duty of the pair that have been performing ON and OFF operation so as to obtain on-duty controlling the PFC voltages during a half cycle before polarity of the AC source is switched are adjusted so as to set a switching flag, and 2) when a decision is made that the polarity of the AC source is not switched, a decision is then made as to whether or not the switching flag is set, and if the switching flag is set, pulse signals that drive the pair of first and third switching elements and pulse signals that drive the pair of second and fourth switching elements are switched.

15. The method for controlling the switching power unit according to claim 9, wherein the switching controller performs the following processes:

1) an A/D conversion process by which signals output from the PFC voltage detector and signals output from the output voltage detector are each A/D converted;

2) an operation process that computes control frequencies and on-duty of pulse signals that drive the first to fourth switching elements based on the A/D converted signals;

3) an output limit process that restricts the control frequencies and the on-duty obtained by the operation process within a predetermined range fitted by an upper and a lower limit; and 4) a PWM output process that produces and outputs pulse signals which drive the first to fourth switching elements based on the control frequencies and the on-duty that have been restricted through the output limit process, wherein the PWM output process includes a PWM output control process where, A) signals output from the polar detector are input so as to decide whether polarity of the AC source is switched;

B) after polarity of the AC source is passed, and when ON and OFF operation of the pair of first and third switching elements and ON and OFF operation of the pair of second and fourth switching elements are switched, the switching cycles and on-duty of the pair that have been performing ON and OFF operation to obtain on-duty controlling the PFC voltages during a half cycle before polarity of the AC source are changed are adjusted; and C) pulse signals that drive the first to fourth switching elements are controlled so that resonance voltages and resonance currents that have the same polarity are not continuously input to the high frequency transformer during the whole cycle of the AC source.

* * * * *